No. 619,292. Patented Feb. 14, 1899.
J. P. FIELD.
HARNESS HITCHING DEVICE.
(Application filed Jan. 29, 1898.)
(No Model.) 2 Sheets—Sheet 1.
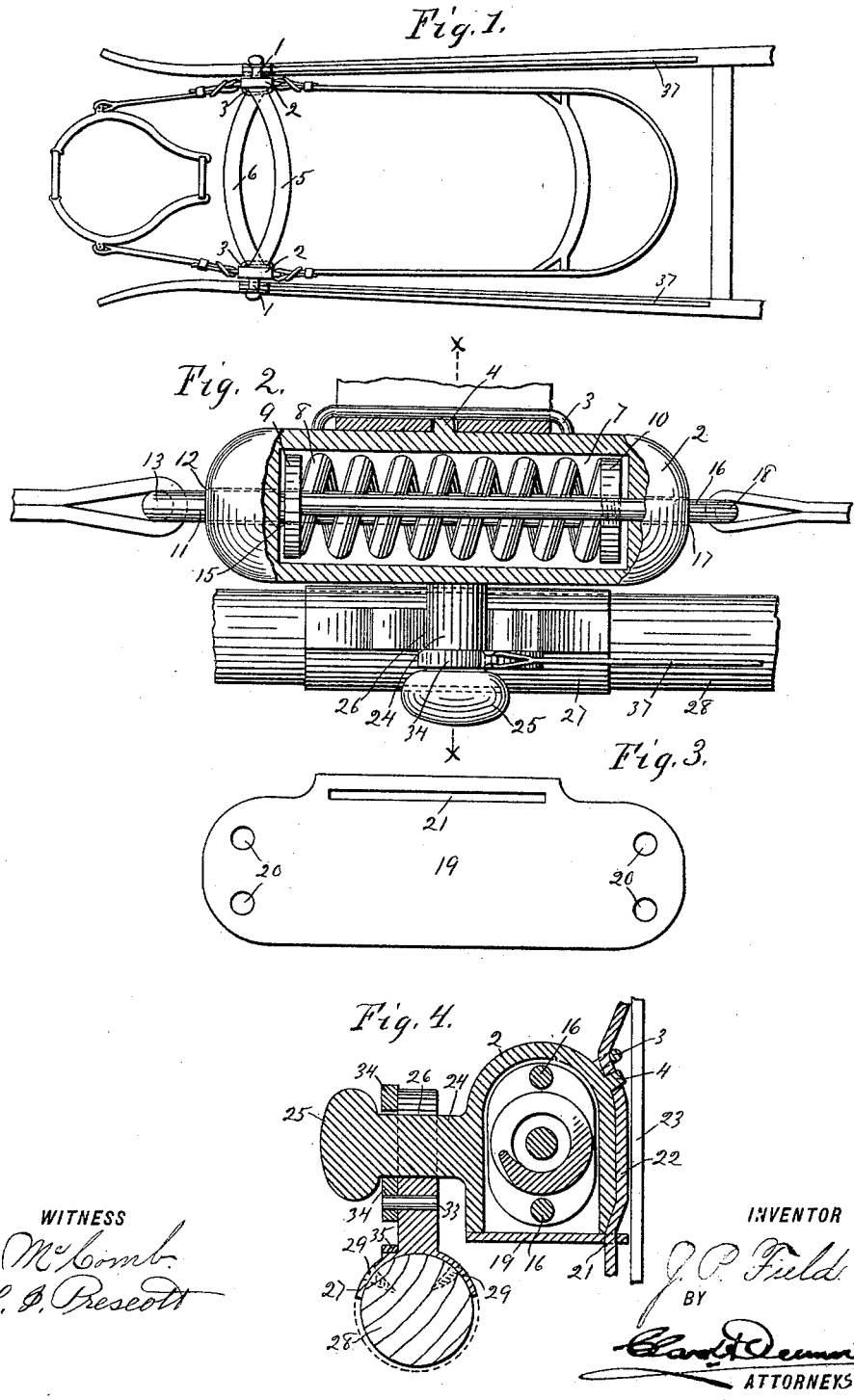
WITNESS
P. McComb
S. D. Prescott
INVENTOR
J. P. Field
BY
Harold Dennis
ATTORNEYS No. 619,292. Patented Feb. 14, 1899.
J. P. FIELD.
HARNESS HITCHING DEVICE.
(Application filed Jan. 29, 1898.)

(No Model.) 2 Sheets—Sheet 2.

WITNESS
P. McComb
S. P. Prescott

INVENTOR
J. P. Field
BY
Cary Deemer & Co.
ATTORNEYS

UNITED STATES PATENT OFFICE.

JAMES POLK FIELD, OF ATLANTA, GEORGIA.

HARNESS-HITCHING DEVICE.

SPECIFICATION forming part of Letters Patent No. 619,292, dated February 14, 1899.

Application filed January 29, 1898. Serial No. 668,393. (No model.)

*To all whom it may concern:*

Be it known that I, JAMES POLK FIELD, a citizen of the United States, and a resident of Atlanta, county of Fulton, and State of Georgia, have invented certain new and useful Improvements in Harness Hitching and Unhitching Devices, of which the following is a specification, reference being had to the accompanying drawings, forming a part thereof, in which similar numerals of reference indicate corresponding parts.

This invention relates to an improved means for hitching and unhitching horses or other animals to and from vehicles having shafts; and the object of the invention is to facilitate the operation of hitching and unhitching and to dispense with the usual whiffletree and long traces and to simplify and cheapen the cost of the necessary harness.

The invention will be hereinafter fully described, and specifically set forth in the annexed claims.

Figure 5:
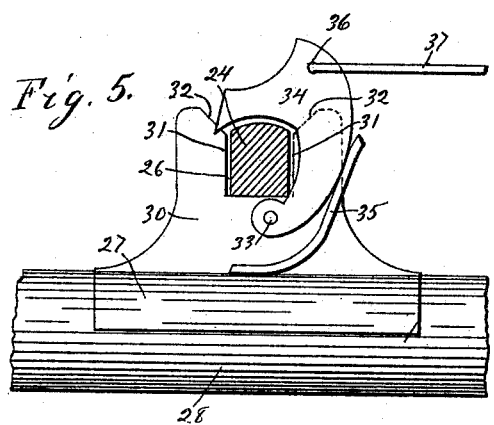
Figure 6:
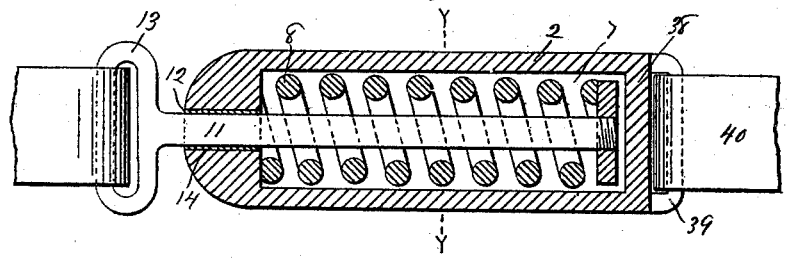
Figure 7:
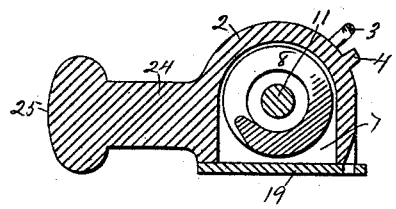

In the accompanying drawings, Figure 1 is a general plan view of the apparatus in locked position between the shafts of a vehicle. Fig. 2 is an enlarged detail plan view of one of the hitching-toggles, the casing being partly broken away. Fig. 3 is a plan view of the plate closing the open side of the toggle-casing. Fig. 4 is a transverse sectional view on the line *x x* of Fig. 2. Fig. 5 is a side elevation of the socket and spring fixed upon one of the shafts of the vehicle, the enlarged end of the toggle being broken away. Fig. 6 is a longitudinal sectional elevation of a modification of the casing. Fig. 7 is a transverse sectional view on the line *y y* of Fig. 6.

In applying my invention I employ the toggles 1 1, formed integrally with the spring-casings 2 2, said casings having upon the inner sides thereof metallic loops 3 3, formed integrally therewith and being provided with a projecting spur 4, adapted for engagement with suitable holes in the lug-strap 5 and belly-girth 6. A chamber 7 within said casing 2 is adapted to receive a compressible spiral spring 8, said spring being adapted to normally retain in extended position the plates 9 and 10. The plate 10 is fixed by any approved means upon the end of a draft-rod 11, said draft-rod passing longitudinally through the center of said spiral spring and through a suitable hole 12 in the thickened forward end of said casing, its free end terminating in a loop 13, adapted to receive and hold one end of a short trace. The said hole 12 in the forward end of the casing may be provided with an antifriction-lining 14, of babbitt or other suitable material. The rear end of said spring 8 rests against the forward part of the plate 10. The forward end of said spring 8 rests against the rear face of the plate 9, said plate being provided with a suitable hole 15, through which the draft-rod 11 is adapted to slide. To opposite sides and preferably to the top and bottom portions of said plate 9 are fixed by any approved means the backing-rods 16 16, which pass rearwardly outside of the spiral spring and the plate 10 and through suitable holes 17 17 in the thickened rear end of the casing 2. Said rods are preferably connected integrally in the form of a loop 18 outside of said casing, said loop being adapted to receive and hold the backing-strap connected with the breeching of the harness. One side of said casing, preferably the lower side thereof, must be left open to allow for the insertion of the spiral spring and draft-rods. This opening is normally closed by means of the attachable plate 19, provided with the holes 20 20 and the slot 21. Said plate is connected with said casing by means of screws passed through said holes 20 and threaded into suitable holes in the casing, but may be connected therewith in any approved manner. The slot 21 in said plate 19 is adapted to receive the lug-strap 22. Upon the upper inner quarter of said casing is the spur 4, adapted for engagement with suitable holes in the lug-strap 22. Located above said spur is the loop 3, adapted to retain said lug-strap 22 in position over the spur 4.

To prevent chafing of the parts against the saddle, a lining-strap 23 is provided, which may be attached to the lug-strap 22 above and below the casing, or it may be independent thereof and attached to the saddle.

The toggle 1 comprises a neck 24, projected at right angles from and formed integrally with the outer side of said casing. Said neck is of sufficient strength to stand all the strain brought upon the horse by the loaded vehicle. At the outer end of said neck is an enlarged portion 25, formed integrally therewith and preferably in the shape of a knob, said knob being adapted to prevent the withdrawal of the toggle from the socket 26 when in locked position. Said socket comprises a base portion 27, adapted to clasp or encircle the shaft 28 of the vehicle, and may be fastened thereto by means of the screws 29 29 or by any other preferred manner. An upwardly-projecting neck 30, formed integrally therewith, forms the base of the socket 26. Two spurs projecting upwardly form the side walls 31 31 of said socket, adapted to receive toggle-neck 24. The upper inner portions of said walls are preferably beveled at 32 to facilitate the entrance of the toggle into the socket.

Pivoted to the neck 30 by means of the rivet 33 is the latch 34, adapted to swing over the neck of the toggle when in position in said socket, thereby locking said toggle in position and preventing vertical displacement of said toggle.

The spring 35, fixed by any approved means to the base of the socket, is adapted to contact with the rear face of the latch 34 and normally hold it in locked position over the neck of the toggle.

The hole 36 is provided in the upper portion of the latch 34, through which a cord 37 may be passed, and said cord led to any convenient point within the reach of the driver of the vehicle and by means of which he can instantly detach the toggle from the socket fixed upon the shaft, thereby unhitching the horse from the vehicle.

In light vehicles, where the spring action of the backing-strap is not necessary, the casing and arrangement of the spring therein may be somewhat modified, as shown in Fig. 6. In this case the backing-rods 16 16 and the plate 9, fixed to the ends thereof, may be dispensed with and the rear wall 38 of the casing 2 may be thinner than is necessary when backing-rods pass through said casing. A loop 39, preferably formed integrally with said rear wall 38, is adapted to receive and hold the backing-strap 40. The plate 10, draft-rod 11, and loop 13 are the same in both instances, but the forward end of the spring 8 in the modification contacts directly with the inner side of the forward wall of the casing.

In the operation of the device the spring 8 is inserted in the open casing, the plates 9 and 10 are placed in position, and the ends of the draft-rod 11 and backing-rods 16 16 are inserted in the apertures provided for them in the end walls of the casing and fixed to their respective plates. The plate 19 is then placed in position and fastened to the casing, thereby closing the opening. The lug-strap 22 is then passed downwardly inside of the loop 3 and on the inner side of the casing 2 and through the slot 21 of the bottom plate and then buckled to the belly-girth of the harness. The short traces are then connected with the loop in the draft-rod and with the hames in the usual manner. The backing-strap is also connected with the backing-loop 18 in the usual manner. After the harness has been placed upon the horse the horse is placed between the shafts of the vehicle and the shafts raised until the toggle-neck 24 is immediately over the socket 26. The latch 34 is then sprung back into unlocked position and the toggle-neck entered in the socket. The latch is then allowed to spring back over said neck, thereby retaining it in locked position. To unhitch the horse from the vehicle, it is merely necessary to spring the latch 34 back by hand or by means of the cord 37, when the shafts will drop and the horse be freed from the vehicle.

The casing of the device must be of sufficient size to contain a spiral spring of sufficient power and resiliency to adapt itself to the shoulder motion of the animal in such a manner as to keep the harness always firmly against the shoulder, while at the same time preventing the chafing of the horse. Pulling on the draft-rod will cause the spring to be compressed between the plate 10, fixed upon the end of said draft-rod, and the plate 9 or the inner side of the front wall of the casing. When the resistance is lessened, the spring will return the plate 10 to its normal position automatically.

When it is desired to back the vehicle, power is applied to the backing-rods 16 16 through the medium of the breeching and backing straps and the spring will be compressed between the plates 9 and 10. As soon as the backing action of the horse ceases the spring will automatically return said plate 9 to its normal position in the forward end of the chamber 7.

I do not confine myself to the specific details of mere mechanical construction as herein described, as it is obvious that under the scope of my invention I am entitled to slight structural variations. For instance, the base of the fixed socket upon the shaft may encircle the said shaft, as shown by the dotted lines, Fig. 4 of the drawings.

Having thus described my invention, what I claim as new, and desire to secure by Letters Patent, is—

1. A harness-hitching device, comprising a casing having a toggle formed thereon, said toggle having an enlarged free end, a socket on the shaft of the vehicle engaging the said toggle, and a latch to prevent vertical displacement thereof, a draft and backing relieving spring within the said casing, and means for attaching the said casing to the lug-strap and belly-girth of a harness, substantially as shown and described.

2. In a harness-hitching device of the type specified, the combination of a casing provided with a toggle, a compressible spiral spring within said casing, said spring being normally extended between the forward wall of the casing and a sliding plate fixed upon the rear end of a draft-rod, said draft-rod passing longitudinally forward through the center of said spiral spring and through a suitable aperture in the forward end wall of said casing, its free end terminating in a loop adapted to receive one end of the trace, said casing being provided with a loop formed integrally therewith and adapted to receive and confine one end of the backing-strap, and with an integral loop and spur adapted to secure said casing to the lug-strap of the harness, with a socket and a spring-latch upon the shaft of a vehicle, said socket engaging the toggle of the said casing, and said latch preventing vertical displacement thereof, substantially as shown and described.

3. In a harness-hitching device of the type specified, a casing provided with a toggle, a compressible spiral spring within said casing, said spring being normally extended between a plate fixed upon the rear end of the draft-rod and a plate fixed upon the forward end of two oppositely-positioned backing-rods, said backing-rods being adapted to slide through suitable apertures in the rear wall of said casing and terminating in an integral loop adapted to receive and confine one end of the backing-strap, with an integral loop and spur adapted to secure said casing to the lug-strap of the harness, substantially as shown and described.

4. In a harness-hitching device, the combination of the casing, provided with a toggle, a compressible spring within said casing, draft and backing rod, and a detachable plate adapted to close the open side of said casing, said plate being provided with a longitudinal slot near the inner edge thereof, said slot being adapted to receive the end of the lug-strap, and means for securing said plate to said casing, substantially as shown and described.

5. In a harness-hitching device, a socket embodying a base portion, the lower side of which is concaved and adapted to fit closely to the shaft of the vehicle, means for connecting said base portion to said shaft, an upwardly-projecting neck formed integrally with said base-plate and adapted to form the base of the socket, two upwardly-projected spurs formed integrally with said neck and adapted to form the side walls of the socket, the upper portion of said side walls being beveled to facilitate the entrance of the hitching-toggle, and a spring-latch to prevent vertical displacement of the toggle, substantially as shown and described.

In testimony that I claim the foregoing as my invention I have signed my name, in presence of two witnesses, this 24th day of January, 1898.

JAMES POLK FIELD.

Witnesses:
   B. McComb,
   M. G. McClean.